US011788231B2

(12) United States Patent
Reed et al.

(10) Patent No.: US 11,788,231 B2
(45) Date of Patent: Oct. 17, 2023

(54) PAPER SUBSTRATES INCORPORATING COVERT MARKING PIGMENTS, AND PROCESSES FOR OBTAINING AND USING SAME

(71) Applicant: INTERNATIONAL PAPER COMPANY, Memphis, TN (US)

(72) Inventors: David Verd Reed, Blue Ash, OH (US); Matthew James Bovee, Morrow, OH (US); James D. Regel, Loveland, OH (US); Benny Joe Skaggs, Maineville, OH (US); Maria A. Dannemiller, Memphis, TN (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 16/450,320

(22) Filed: Jun. 24, 2019

(65) Prior Publication Data
US 2020/0399834 A1 Dec. 24, 2020

(51) Int. Cl.
| | | |
|---|---|---|
| *D21H 21/48* | (2006.01) | |
| *B42D 25/382* | (2014.01) | |
| *D21H 19/38* | (2006.01) | |
| *G01N 21/64* | (2006.01) | |
| *D21H 21/16* | (2006.01) | |
| *D21H 23/78* | (2006.01) | |

(52) U.S. Cl.
CPC ........... *D21H 21/48* (2013.01); *B42D 25/382* (2014.10); *D21H 19/38* (2013.01); *D21H 19/385* (2013.01); *D21H 21/16* (2013.01); *D21H 23/78* (2013.01); *G01N 21/64* (2013.01)

(58) Field of Classification Search
CPC ...... D21H 19/38; D21H 19/385; D21H 21/16; D21H 21/28; D21H 21/285; D21H 21/40; D21H 21/48; D21H 23/78; B41M 3/144; B41M 3/14; B42D 25/29; B42D 25/382; C09K 11/7771; Y10S 428/916; G01N 21/64
See application file for complete search history.

(56) References Cited

U.S. PATENT DOCUMENTS

| | | | |
|---|---|---|---|
| 6,149,719 A | 11/2000 | Houle | |
| 6,255,948 B1 * | 7/2001 | Wolpert | G08B 13/2448 340/572.8 |
| 6,506,476 B1 * | 1/2003 | Kaule | B41M 3/144 428/195.1 |
| 6,686,074 B2 * | 2/2004 | Muth | C09K 11/7771 235/491 |
| 6,841,092 B2 | 1/2005 | Paeschke et al. | |
| 6,905,538 B2 | 6/2005 | Auslander | |
| 7,462,840 B2 | 12/2008 | Ross | |
| 7,648,648 B2 * | 1/2010 | Bley | G06K 19/14 252/301.4 S |
| 8,382,947 B2 | 2/2013 | Skaggs et al. | |
| 8,403,223 B2 | 3/2013 | Lewis et al. | |
| 8,536,532 B1 | 9/2013 | Kross et al. | |
| 9,057,159 B2 * | 6/2015 | Honnorat | D21H 17/70 |
| 9,224,082 B2 * | 12/2015 | Ebert | G06K 19/06009 |
| 9,251,550 B2 * | 2/2016 | Tierney | B41M 3/144 |
| 9,422,473 B2 * | 8/2016 | Ebert | C09K 11/7771 |
| 9,745,700 B2 | 8/2017 | Tan et al. | |
| 9,850,384 B2 | 12/2017 | Rueger | |
| 9,878,574 B2 * | 1/2018 | Merchant | G07D 7/1205 |
| 9,909,010 B2 | 3/2018 | Schmidt | |
| 2002/0130303 A1 * | 9/2002 | Muth | B41M 3/12 252/500 |
| 2003/0072940 A1 * | 4/2003 | Siggel | C09K 11/7771 428/364 |
| 2005/0031838 A1 | 2/2005 | Lagunowich et al. | |
| 2007/0102920 A1 * | 5/2007 | Bi | B42D 25/333 283/72 |
| 2008/0087189 A1 * | 4/2008 | Lin | C01F 17/206 106/31.9 |
| 2008/0098931 A1 | 5/2008 | Skaggs et al. | |
| 2008/0236447 A1 * | 10/2008 | Argoitia | G09F 3/00 106/31.65 |
| 2010/0219377 A1 | 9/2010 | Ebert | |
| 2012/0321783 A1 * | 12/2012 | Hampden-Smith | C09D 7/70 427/162 |

(Continued)

FOREIGN PATENT DOCUMENTS

| | | | | |
|---|---|---|---|---|
| EA | 028631 B1 | 12/2017 | | |
| EP | 1241021 A2 * | 9/2002 | .............. | B41M 3/12 |

(Continued)

OTHER PUBLICATIONS

Artamonov, S.V.; Search Report; Russian Application No. 2022101289/04; dated Jun. 29, 2022; Rospatent, Russia.
Michael Bradshaw; Examination Report; Australian Application No. 2020308438; dated Feb. 6, 2023; IP Australia.
Christian Dan Opris; Office Action; Canadian Application No. 3,145,231; dated Feb. 23, 2023; Canadian Intellectual Property Office; Quebec, Canada.
Philippe Ponsaud; EP Article 94(3) Communication; European Application No. 20742981.2; dated Oct. 28, 2022; Munich, Germany.

(Continued)

*Primary Examiner* — Jose A Fortuna

(57) ABSTRACT

Paper substrates which incorporate covert marking pigments (CMPs) which are one or more infrared (IR) anti-Stokes pigments. Also, processes for incorporating such CMPs into a paper substrate other than by a printing technique, such as, for example, by using a size press or spraying, as well as processes for identifying the presence of such CMPs incorporated into a paper substrate sheet with an infrared (IR) pigment sensor of, for example, a copier or printer for the purpose of adjusting the quantity of printer pigment deposited on a paper substrate sheet or to determine whether the paper substrate sheet is an authentic or counterfeit document.

18 Claims, No Drawings

(56) References Cited

U.S. PATENT DOCUMENTS

| | | |
|---|---|---|
| 2013/0335784 A1 | 12/2013 | Kurtz et al. |
| 2014/0151997 A1* | 6/2014 | Kane ............... B42D 25/24 |
| | | 283/85 |
| 2015/0268017 A1 | 9/2015 | Diemer et al. |
| 2017/0037578 A1 | 2/2017 | Skaggs et al. |
| 2017/0369777 A1 | 12/2017 | Collins et al. |
| 2018/0050555 A1 | 2/2018 | Berthe et al. |
| 2020/0399834 A1* | 12/2020 | Reed ............... D21H 21/16 |
| 2021/0323335 A1* | 10/2021 | Benninger ........ B42D 25/369 |

FOREIGN PATENT DOCUMENTS

| | | | |
|---|---|---|---|
| FR | 2917418 A1 * | 12/2008 | ............ C09D 11/50 |
| RU | 2163197 C1 | 2/2001 | |
| RU | 2664945 C1 | 8/2018 | |
| WO | WO-2007003531 | 1/2007 | |
| WO | WO-2014006173 A1 | 1/2014 | |
| WO | WO-2014032238 | 3/2014 | |
| WO | WO-2015091237 | 6/2015 | |
| WO | WO-2016096681 | 6/2016 | |
| WO | WO-2017194189 A1 | 11/2017 | |
| WO | WO-2018004469 A2 | 1/2018 | |

OTHER PUBLICATIONS

Philippe Ponsaud; International Search Report and Written Opinion; Application No. PCT/US2020/039074; dated Sep. 11, 2020; European Patent Office, Munich, Germany.

Philippe Ponsaud; International Preliminary Report on Patentability Chapter II; Application No. PCT/US2020/039074; dated Jul. 30, 2021; European Patent Office, Munich, Germany.

David Verd Reed et al.; Related U.S. Appl. No. 18/457,578, filed Aug. 29, 2023 entitled "Paper Substrates Incorporating Covert Marking Pigments, and Processes for Obtaining and Using Same".

* cited by examiner

PAPER SUBSTRATES INCORPORATING COVERT MARKING PIGMENTS, AND PROCESSES FOR OBTAINING AND USING SAME

FIELD OF THE INVENTION

The present invention broadly relates to paper substrates (including paper substrate sheets) which incorporate covert marking pigments (CMPs) which are one or more infrared (IR) anti-Stokes pigments. The present invention also broadly relates to processes for incorporating such CMPs into a paper substrate other than by a printing technique, such as, for example, by using a size press or spraying. The present invention further broadly relates to processes for identifying the presence of such CMPs incorporated into a paper substrate sheet with an infrared (IR) pigment sensor of, for example, a copier or printer for the purpose of adjusting the quantity of printer pigment deposited on the paper substrate sheet or to determine whether from the paper substrate sheet is an authentic or counterfeit document.

BACKGROUND

In recent years, the demand for effective "invisible ink" compositions has steadily increased. "Invisible ink" compositions involve a broad class of ink formulations with no or minimal visibility to the unaided (naked) eye when applied to, for example, a paper substrate and viewed with "natural light" (e.g., light from the sun), or light from conventional lamps or other sources of visible light. These visible light forms may be collectively referred to as "white light" which involves a combination of various colored light fractions which generally fall within a wavelength range of, for example, from about 300 to about 700 nm. Under these illumination conditions, "invisible ink" compositions are either colorless or virtually colorless. Only after illumination outside the visible light spectrum do the printed images with these "invisible ink" compositions become visible or otherwise detectable, with or without auxiliary observation equipment such as a detector, sensor, scanner, etc. See U.S. Pat. No. 6,149,719 (Houle), issued Nov. 21, 2000.

The uses of "invisible ink" compositions may vary. For example, "invisible ink" compositions may provide many benefits when printed on a variety of paper substrate documents including insurance policies, checks, etc. For example, invisible ink compositions may be used on paper substrate documents prepared by financial or investment institutions (e.g., checks, account statements, routing documents, banknotes, stocks, bonds, certificates, vouchers, etc.), by vendors issuing event admission tickets, by governments issuing identification papers such as passports, by manufacturers on packaging, labeling, etc., of products, etc. Such paper substrate documents may contain a wide variety of routing codes, numerical identifiers, data summaries, etc., which remain invisible to the unaided eye under "white light," but which are revealed when illuminated, sensed, scanned, etc., with other than "white light" to identify whether these paper substrate documents are authentic or counterfeit, to reveal information, data, etc., present on paper substrate documents to only certain recipients of such documents, e.g., customers, etc. For example, it may be desired to include barcoding on such paper substrate documents for inventory control, product assembly applications in factories, etc., where the particular barcode does not appear in visible form on such products, packaging, labels, etc., being processed. See U.S. Pat. No. 6,149,719 (Houle), issued Nov. 21, 2000.

In addition, banknotes, stocks, bonds, certificates, vouchers, checks, valuable admission tickets and other valuable paper substrate documents such as passports and other identity documents may be at risk of counterfeiting, as well as product protection elements such as labels, seals, packaging, etc. There are several ways to validate whether such documents are authentic or a counterfeit, ranging from simple to complex. Some methods involve hidden (i.e., covert) features which may be incorporated in such documents, for example, by the use of invisible ink compositions. These covert features may be provided by printing these invisible ink compositions onto the paper substrate of the document in a particular pattern, arrangement, etc. Since these covert features are not detectable, visible, etc., by the human eye, detectors, sensors, scanners, etc., may be used and configured to detect, identify, reveal, etc., these covert features to authenticate such documents. See U.S. Pat. No. 6,149,719 (Houle), issued Nov. 21, 2000.

While invisible ink compositions comprise materials with at least some absorbance of light outside the visible bandwidth, they may also contain materials which impart visible color (sometimes referred to as "crosstalk") which may make the invisible ink composition usable only under more limited conditions. For example, one such invisible ink composition uses an infrared (IR) ink that absorbs IR light having a wavelength of 793 nm and fluorescently emits IR light at a longer wavelength of 840 nm. Because such an ink has a faint green appearance, the ink density may need to be lowered to retain invisibility, but also making the detection of features printed with that ink more difficult. Additionally, both a specialized light source and an imaging device may be required to detect such inks. Another example of an invisible ink composition uses a silicon naphthalocyanine-based IR absorbing ink which provides a small light absorption change at a wavelength of 790 nm which can be detected by using an illumination source emitting at wavelength 790 nm. This smaller IR absorption change is also limited in part by visible "crosstalk" as this particular ink dye is not truly invisible, but also has a visible green tint. Additionally, "crosstalk" from the visible ink dye absorption into the IR spectrum may mask or confuse this weak IR absorption signal. But increasing the IR absorption density to improve signal detection may be limited because the "crosstalk" in visible absorption region may increase as well. In addition, such IR ink dyes or pigments may be unstable, especially when used in lower concentrations, and thus vulnerable to environmental degradation, including high humidity or ink dye fade when exposed to UV or visible light. See U.S. Pat. No. 8,941,886 (Kurtz et al.), issued Jan. 27, 2015.

Invisible ultraviolet (UV) inks compositions have also been used such as those inks in which incident UV light stimulates visible fluorescence. Such UV-stimulated inks are revealed by illumination from specialized light sources such as black lights or UV LEDs that provide UVA (wavelength of 315-400 nm) or UVB (wavelength of 280-315 nm) light. Because atmospheric filtered solar UV light extends down to a wavelength 280 nm, there may be a risk for accidental activation and revealing of features when using such ultraviolet (UV) inks. See U.S. Pat. No. 8,941,886 (Kurtz et al.), issued Jan. 27, 2015.

SUMMARY

According to a first broad aspect of the present invention, there is provided a covertly marked paper substrate article comprising:

a paper substrate; and a covert marking pigment having a particle size in the range of from about 0.1 to about 5 microns and being incorporated into the paper substrate in a IR detectable amount in the range of from about 0.1 to about 1,000 mg/m$^2$, the covert marking pigment being one or more IR anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof.

According to a second broad aspect of the present invention, there is provided a process for preparing a covertly marked paper substrate, the process comprising the following steps:

(a) providing a composition comprising a covert marking pigment having a particle size in the range of from about 0.1 to about 5 microns, the covert marking pigment being one or more IR anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof; and (b) incorporating the composition of step (a) by a non-printing technique into a paper substrate sheet in an IR detectable amount in the range of from about 0.1 to about 1,000 mg/m$^2$.

According to a third broad aspect of the present invention, there is provided a process for adjusting the amount of printer pigment deposited on a paper substrate sheet, the process comprising the following steps:

(a) providing a covertly marked paper substrate sheet, the covertly marked paper substrate sheet comprising:
   a paper substrate sheet; and
   a covert marking pigment having a particle size in the range of from about 0.1 to about 5 microns and being incorporated into the paper substrate sheet in an IR detectable amount in the range of from about 0.1 to about 1,000 mg/m$^2$ and in a manner which identifies a type of covertly marked paper substrate sheet, the covert marking pigment being one or more IR anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof;

(b) scanning the covertly marked paper substrate sheet of step (a) with an IR pigment sensor to identify the type of covertly marked paper substrate sheet; and (c) adjusting the quantity of printer pigment deposited on the of covertly marked paper substrate sheet in response the type of covertly marked paper substrate sheet identified in step (b).

According to a fourth broad aspect of the present invention, there is provided a process for determining whether or not a paper substrate sheet is an authentic document, the process comprising the following steps:

(a) providing a paper substrate sheet; and (b) scanning the paper substrate sheet with an IR pigment sensor to detect whether or not the paper substrate sheet incorporates a specified covert marking pigment, the covert marking pigment being one or more anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof;

wherein if the IR pigment sensor detects that the paper substrate sheet: (i) does incorporate the specified covert marking pigment, the paper substrate sheet is identified as authentic; or (ii) does not incorporate the specified covert marking pigment, the paper substrate sheet is identified as counterfeit.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For purposes of the present invention, the term "covert marking pigment (CMP)" refers to a composition, compound, substance, material, etc., which is colorless or nearly colorless in the visible light spectrum, but which is visible in the infrared (IR) spectrum. For purposes of the present invention the term "specified covert marking pigment" refers to a particular covert marking pigment having a known type of covert marking pigment for which the IR pigment sensor has been tuned to detect.

For purposes of the present invention, the term "IR anti-Stokes shift pigment" refers to a CMP which is an up-converting phosphor that absorbs light in the infrared (IR) spectrum, but emits light in the visible spectrum. Suitable anti-Stokes shift pigments may include, for example, one or more of: yttrium oxide; sodium yttrium fluoride; lanthanum oxide; lanthanum fluoride; yttrium oxysulfide; lanthanum oxysulfide; etc. These anti-Stokes shift pigments may also be doped with one or more other rare earth elements such as ytterbium, erbium, thulium, holmium, etc. See U.S. Appln. No. 20170369777 (Collins et al.), published Dec. 28, 2017, the entire contents and disclosure of which is herein incorporated by reference, especially paragraphs [0035] through [0037].

For purposes of the present invention, the term "visible light spectrum" refers to the light spectrum having a wavelength in the range of from about 400 nm to about 700 nm.

For purposes of the present invention, the term "infrared (IR) spectrum" refers to the light spectrum having a wavelength which is longer than about 700 nm and typically in the range of above about 700 nm to about 1 mm.

For purposes of the present invention, the term "ultraviolet (UV) light spectrum" refers to the light spectrum having a wavelength less than about 400 nm. The UV light spectrum may be divided into ultraviolet A (UVA) light spectrum (wavelength in the range of from about 315 to about 400 nm), the ultraviolet B (UVB) light spectrum (wavelength in the range of from about 280 to about 315 nm), and the ultraviolet (UVC) light spectrum (wavelength in the range of from about 100 to about 280 nm).

For purposes of the present invention, the term "IR detectable amount" refers to an amount of an IR anti-Stokes shift pigment which is detectable by an IR sensor when incorporated by a non-printing technique into a paper substrate.

For purposes of the present invention, the term "IR pigment sensor" refers to a sensor which can detect the presence of an IR anti-Stokes shift pigment. The IR pigment sensor includes an excitation element that stimulates and causes the IR anti-Stokes shift pigment to luminesce within a particular wavelength range, as well as a detector element which can detect (sense) this luminescence within that wavelength range. The excitation and detector elements may be incorporated as a single component, or may be separate components but which cooperate together in the operation of the IR pigment sensor. IR pigment sensor may also be a separate piece of equipment or may be an attachment for a printer, a copier, a scanner, a multifunctional copier/printer/scanner/fax machines, etc. Suitable IR pigment sensors may include: NTE3033 Infrared Photodiodes from NTE Electronics, Inc., Blumfield; N.Y.; RadioShack Infrared LED Emitter and Detector from SparkFun Electronics; Grove Infrared Reflective Sensor v1.2 from Seeed Studio or Arduino; etc.

For purposes of the present invention, the term "non-printing technique" refers to process for incorporating a covert marking pigment (CMP) into a paper substrate other than by printing the CMP onto a paper substrate. Suitable non-printing techniques for incorporating the CMP into a paper substrate may include, for example, applying the CMP at the size press, for example, as part of a sizing composition, by spraying the CMP onto a paper substrate; by incorporating into the paper furnish at the wet end of a paper making machine; by curtain coating; by incorporating into the paper furnish at the head box; by incorporating at other nip points into the paper furnish; by bonding to the paper fibers; by using the process disclosed in U.S. Appln. No. 20170037578 (Skaggs et al.), published Feb. 9, 2017 (the entire disclosure and contents of which are herein incorporated by reference) involving separately treating one or both surfaces of a paper substrate with an optical brightening agent (OBA) and a multivalent metal salt drying agent, wherein one or both surfaces of the paper substrate is treated with one of these two agents at the size press, and wherein the surface(s) is treated with the other of these two agents before or after the size press, but substituting the CMP in place of the OBA; etc.

For purposes of the present invention, the term "random" refers to a distribution of the CMP in a manner which is not recognizable (e.g., repeating) pattern, for example, no regular and/or evening spacing of CMP distribution, etc.

For the purposes of the present invention, the term "pseudorandom" refers to distribution of the CMP which is in a manner that appears to be random, but which is not completely random in that there may have in some areas, locations, etc., where the distribution of the CMP may be in a recognizable pattern. For example, the CMP may be sprayed onto the paper substrate (e.g., by an oscillating jet) where the CMP is applied as discontinuous spray (and at a lower flow rate) such that the CMP is distributed in portions of the paper substrate as a recognizable pattern.

For the purposes of the present invention, the term "spectral interference" refers to those instances where either the light absorption spectra and/or the light emittance spectra of two or more phosphors are not sufficiently separated (e.g., there is absorption or emittance spectra overlap) such that there is interference between those phosphors in terms of absorbing or emitting a particular wavelength or a range of wavelengths of light. In other words, when spectral interference occurs, the fluorescent materials are competing for the same wavelength or the same range of wavelengths of light.

For purposes of the present invention, the term "document" (interchangeably referable to as "cards," or "documentation") refers to an article comprising one or more paper substrates wherein the paper substrate(s) incorporating CMPs, and having information printed thereon which may be used for purposes of identification, to communicate information (e.g., data), to record information (e.g., data), etc. Documents may include, for example, passports, driver's licenses, network access cards, employee badges, visas, immigration documentation, national ID cards, citizenship cards, social security cards, security badges, certificates, identification cards, voter registration cards, police ID cards, border crossing cards, legal instruments (e.g., contracts, wills, trusts, etc.), security clearance badges and cards, gun permits, gift certificates or cards, labels or product packaging, membership cards or badges, etc.

For the purposes of the present invention, the term "authentic" refers to whether the document is genuine, real, valid, bona fide, original, etc.

For the purposes of the present invention, the term "counterfeit" refers to whether the document is a fake, copy, forged, imitation, bogus, etc.

For the purposes of the present invention, the term "paper fibers" refers to any fibrous material which may be used in preparing a fibrous paper web. Paper making fibers may include pulp (wood) fibers (e.g., softwood fibers and/or hardwood fibers), kraft fibers (e.g., pulp fibers produced by the kraft pulping process), as well as wood fibers produced by soda, sulfite, magnetite, cold soda, NSSC, etc., pulp making processes, synthetic fibers, waste paper fibers, recycled paper fibers, fibers from any of hemp, jute, ramie, flax, cotton linters, abaca, wood waste, straw, bagasse, bamboo, sisal, synthetic (e.g., bicomponent) fibers, etc., as well as any combinations of such fibers.

For the purposes of the present invention, the term "softwood fibers" refers to fibrous pulps derived from the woody substance of coniferous trees (gymnosperms) such as varieties of fir, spruce, pine, etc., for example, loblolly pine, slash pine, Colorado spruce, balsam fir, Douglas fir, jack pine, radiata pine, white spruce, lodgepole pine, redwood, etc. North American southern softwoods and northern softwoods may be used to provide softwood fibers, as well as softwoods from other regions of the world. Inclusion of softwood fibers tends to impart greater bending stiffness in paper substrates, but also tends to impart rougher and less smooth surfaces in paper substrates, such as those comprising kraft paper fibers.

For the purposes of the present invention, the term "hardwood fibers" refers to fibrous pulps derived from the woody substance of deciduous trees (angiosperms) such as birch, oak, beech, maple, eucalyptus, poplars, etc. Inclusion of hardwood fibers in paper substrates tends to impart smoother surfaces in paper substrates.

For the purposes of the present invention, the term "bleached fibers" refers to paper fibers which have been subjected to a bleaching process to, for example, increase the brightness, whiteness, etc., of the paper substrate prepared from such fibers.

For the purposes of the present invention, the term "bulk" refers to the volume or thickness of the paper fibers in relation to their weight. Bulk is the reciprocal of the density (weight per unit volume), and may be calculated from caliper and basis weight of a paper substrate comprising the paper fibers. Decreasing the bulk (or in other words, increasing the density) of, for example, a paper substrate sheet, causes that sheet to be smoother, glossier, less opaque, darker, lower in strength, etc. Bulk is measured by TAPPI T-220 method and is reflected in units of cc/g.

For the purposes of the present invention, the term "optical brightener agent (OBA)" refers to certain fluorescent materials which may increase the brightness (e.g., white appearance) of paper substrate surfaces by absorbing the invisible portion of the light spectrum (e.g., from about 340 to about 370 nm) and converting this energy into the longer-wavelength visible portion of the light spectrum (e.g., from about 420 to about 470 nm). In other words, the OBA converts invisible ultraviolet light and re-emits that converted light into blue to blue-violet light region through fluorescence. OBAs may also be referred to interchangeably as fluorescent whitening agents (FWAs) or fluorescent brightening agents (FBAs). These OBAs may include one or more of: 4,4'-bis-(triazinylamino)-stilbene-2,2'-disulfonic acids, 4,4'-bis-(triazol-2-yl)stilbene-2,2'-disulfonic acids, 4,4'-dibenzofuranyl-biphenyls, 4,4'-(diphenyl)-stilbenes, 4,4'-distyryl-biphenyls, 4-phenyl-4'-benzoxazolyl-stilbenes, stilbenzyl-naphthotriazoles, 4-styryl-stilbenes, bis-(benzoxazol-2-yl) derivatives, bis-(benzimidazol-2-yl) derivatives, coumarins, pyrazolines, naphthalimides, triazinyl-pyrenes, 2-styryl-benzoxazole or -naphthoxazoles, benzimidazole-benzofurans or oxanilides, etc, See commonly assigned U.S. Pat. No. 7,381,300 (Skaggs et al.), issued Jun. 3, 2008, the entire contents and disclosure of which is herein incorporated by reference. In particular, these OBAs may comprise, for example, one or more stilbene-based sulfonates (e.g., disulfonates, tetrasulfonates, or hexasulfonates) which may comprise one or two stilbene residues. Illustrative examples of such anionic stilbene-based sulfonates may include 1,3,5-triazinyl derivatives of 4,4'-diaminostilbene-2,2'-disulphonic acid (including salts thereof), and in particular the bistriazinyl derivatives (e.g., 4,4-bis(triazine-2-ylamino)stilbene-2,2'-disulphonic acid), the disodium salt of distyrlbiphenyl disulfonic acid, the disodium salt of 4,4'-di-triazinylamino-2,2'-di-sulfostilbene, etc. Commercially available disulfonate, tetrasulfonate and hexasulfonate stilbene-based OBAs may also be obtained, for example, from Ciba Geigy under the trademark TINOPAL®, from Clariant under the trademark LEUCOPHOR®, from Lanxess under the trademark BLANKOPHOR®, and from 3V under the trademark OPTIBLANC®. OBAs may be used in embodiments of the process of the present invention in amounts of, for example, from about 0.2 to about 2% by weight of the pulp fibers being bleached, such as from about 0.4 to about 0.6 by weight of the pulp fibers being bleached.

For the purposes of the present invention, the term "unrefined fibers" refers to pulp fibers which have not been refined, i.e., have not be subjected to a process of mechanical treatment, such as beating, to develop or modify the pulp fibers, often to increase fiber bonding strength and/or improve surface properties. See G. A. Smook, Handbook for Pulp and Paper Technologists ($2^{nd}$ Edition, 1992), page 191-202, the entire contents and disclosure of which is herein incorporated by reference, for a general description of the refining of pulp fibers.

For the purposes of the present invention, the term "CTMP fibers" refers to chemithermomechanical pulp (CTMP) fibers which have subjected to a combination of chemical, thermal, and mechanical treatment. As used herein, CTMP fibers refer to fibers which have been treated by chemical, thermal, and mechanical treatment in any order of such treatments, including chemi-thermo-mechanical (C-T-M) pulp fibers, thermo-chemi-mechanical (T-C-M) pulp fibers, thermo-mechanical-chemi (T-M-P) pulp fibers, long fiber chemi-mechanical pulp/chemically treated long pulp fibers (LFCMP/CTLF), etc. See G. A. Smook, Handbook for Pulp and Paper Technologists ($2^{nd}$ Edition, 1992), pages 60-65, the entire contents and disclosure of which is herein incorporated by reference, for a general description of chemithermomechanical pulping (CTMP) for preparing CTMP fibers.

For the purposes of the present invention, the term "bleached CTMP fibers (also referred to interchangeably as "bleached BCTMP fibers" refers to bleached chemithermomechanical pulp (CTMP) fibers which have subjected to one or more bleaching treatments, bleached chemi-thermo mechanical pulp (BCTMP) fibers, neutral sulfite semi chemical-pulp (NSSC) fibers, alkaline peroxide mechanical pulp (APMP/AAP) fibers, etc.

For the purposes of the present invention, the term "paper substrate" refers to a fibrous paper web that may be formed, created, produced, etc., from a mixture, furnish, etc., comprising paper fibers, internal sizing agents, etc., plus any other optional papermaking additives such as, for example, paper fillers, wet-strength agents, optical brightening agents, etc. The paper substrate may be in the form of a continuous roll, a discrete sheet, etc.

For the purposes of the present invention, the term "paper substrate sheet" refers to a discrete sheet of paper substrate.

For the purposes of the present invention, the term "ream" refers to the conventional sense of the term as providing a quantity of printable paper substrate sheets (e.g., a packaged quantity of printable paper substrate sheets) in the range of, for example, from about 480 to about 516 sheets (e.g., 480, 500 or 516 sheets).

For the purposes of the present invention, the term "printable paper substrate" refers to any paper substrate which may be printed on with a printer colorant. Printable paper substrates may include webs, sheets, strips, etc., may be in the form of a continuous roll, a discrete sheet, etc.

For the purposes of the present invention, the term "synthetic fibers" refers to fibers other than wood pulp fibers (e.g., other than pulp fibers) and which may be made from, for example, cellulose acetate, acrylic, polyamides (such as, for example, nylon, etc.) polyacrylics (such as, for example, polyacrylamide, polyacrylonitrile, esters of methacrylic acid and acrylic acid, etc.), polyolefins (such as, for example, polyethylene, polypropylene, etc.), polydienes (such as, for example, polybutadiene, polyisoprene, polynorbomene, etc.), polyepoxides, polyesters, polyethers (such as, for example, polyethylene glycol(polyethylene oxide), polybutylene glycol, polypropylene oxide, polyfluorocarbons, etc.

For the purposes of the present invention, the term "bicomponent fibers" refers to synthetic fibers comprising a core and sheath configuration. The core and sheath portions of these bicomponent fibers may be made from various polymers. For example, bicomponent fibers may comprise a PE (polyethylene) or modified PE sheath which may have a PET (polyethylene terephthalate) or PP (polypropylene) core.

For the purposes of the present invention, the term "basis weight," refers to the grammage of the wood pulp fibers, fibrous web, etc., in the paper substrate as determined by TAPPI test T410. See G. A. Smook, Handbook for Pulp and Paper Technologists ($2^{nd}$ Edition, 1992), page 342, Table 22-11, the entire contents and disclosure of which is herein incorporated by reference, which describes the physical test for measuring basis weight. Basis weights used herein are measured in grams per square meter (gsm) but may also be converted to corresponding basis weights in terms of lbs/1300 ft$^2$ or lbs/3000 ft$^2$. For example, a basis weight of 75 gsm corresponds to a basis weight of about 20 lbs/1300 ft$^2$ or about 46.1 lbs/3000 ft$^2$.

For the purposes of the present invention, the term "substrate pigments" refers to mineral pigments (e.g., calcium carbonate, clay (e.g., kaolin clay), talc, etc.), as well as non-mineral materials (e.g., plastic pigments, etc.), which may be used in paper making to reduce materials cost per unit mass of the paper substrate, increase opacity, increase smoothness, etc. The mineral pigments may be finely divided, for example, in the size range of from about 0.5 to about 5 microns, may be platy mineral pigments, etc.

For the purposes of the present invention, the term "calcium carbonate" refers various calcium carbonates which may be used as substrate pigments, such as precipitated calcium carbonate (PCC), ground calcium carbonate (GCC), modified PCC and/or GCC, etc.

For the purposes of the present invention, the term "precipitated calcium carbonate (PCC)" refers to a calcium carbonate which may be manufactured by a precipitation reaction and which may be used as a substrate (paper) pigment. PCC may comprise almost entirely of the calcite crystal form of $CaCO_3$. The calcite crystal may have several different macroscopic shapes depending on the conditions of production. Precipitated calcium carbonates may be prepared by the carbonation, with carbon dioxide ($CO_2$) gas, of an aqueous slurry of calcium hydroxide ("milk of lime"). The starting material for obtaining PCC may comprise limestone, but may also be calcined (i.e., heated to drive off $CO_2$), thus producing burnt lime, CaO. Water may added to "slake" the lime, with the resulting "milk of lime," a suspension of $Ca(OH)_2$, being then exposed to bubbles of $CO_2$ gas. Cool temperatures during addition of the $CO_2$ tend to produce rhombohedral (blocky) PCC particles. Warmer temperatures during addition of the $CO_2$ tend to produce scalenohedral (rosette-shaped) PCC particles. In either case, the end the reaction occurs at an optimum pH where the milk of lime has been effectively converted to $CaCO_3$, and before the concentration of $CO_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground $CaCO_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "surface size composition" refers to those compositions (e.g., size press compositions) which may comprise, for example, surface sizing agents, substrate pigments, multivalent and/or monovalent metal salt drying agents, cationic dye fixing agents, optical brightening agents (OBAs), solvents, diluents, anti-scratch and mar resistance agents, CMPs, etc. The surface size composition may be formulated as an aqueous solution, an aqueous slurry, a colloidal suspension, a liquid mixture, a thixotropic mixture, etc.

For the purposes of the present invention, the term "internal sizing" refers to sizing present in the paper substrate due to internal paper sizing agents which are included, added, etc., during the papermaking process before a fibrous paper substrate is formed. Internal paper sizing agents generally resist penetration of water or other liquids into the paper substrate by reacting with the paper substrate to make the paper substrate more hydrophobic. Illustrative internal paper sizing agents may include, for example, alkyl ketene dimers, alkenyl succinic anhydrides, etc.

For the purposes of the present invention, the term "surface sizing" refers to sizing agents which are applied on, added to, etc., the surface(s) of the paper substrate. Surface sizing agents generally resist penetration of water or other liquids into the paper substrate by covering the paper substrate with a more hydrophobic film. Illustrative surface sizing agents may include, for example, starch, modified starch, styrene maleic anhydride copolymers, styrene acrylates, polyvinyl alcohol (PVOH), etc.

For the purposes of the present invention, the term "surface sizing starch" refers to surface sizing agents for paper substrates which comprise one or more natural starches (i.e., unmodified starches obtained from plant sources such as maize, wheat, rice, potato, tapioca, etc.) such as cereal starches (e.g., corn starch, wheat starch, rice starch, potato starch, oat starch, rye starch, barley starch, millet sorghum starch, etc.) and non-cereal starches (e.g., tapioca starch, etc.), modified natural starches (e.g., ethylated starches, oxidized starches, such as oxidized corn starch, etc.), or combinations thereof. Modified starches (e.g., oxidized starches such as oxidized corn starch) may be obtained by one or more chemical treatments known in the paper sizing starch art, for example, by oxidation to convert some of —$CH_2OH$ groups to —COOH groups, etc. In some cases the modified starch may have a small proportion of acetyl groups. Alternatively, the starch may be chemically modified to render it cationic (i.e., a cationic starch) or amphoteric (i.e., an amphoteric starch), i.e., with both cationic and anionic charges. The modified starches may also include starches converted to a starch ether, or a hydroxyalkylated starch by replacing some —OH groups with, for example, —$OCH_2CH_2OH$ groups (i.e., a hydroxyethylated starch), —$OCH2CH_3$ groups (i.e., an ethylated starch), —$OCH_2CH_2CH_2OH$ groups (i.e., a propylated starch), etc.

For the purposes of the present invention, the term "multivalent metal drying salt" refers to those metal drying salts wherein the cationic moiety has a positive charge of two or more (e.g., a calcium cation, a magnesium cation, an aluminum cation, etc.) such as calcium salts, magnesium salts, aluminum salts, etc., and which are water soluble. The counter anions for these multivalent metal drying salts may include, for example, chloride, bromide, acetate, bicarbonate, sulfate, sulfite, nitrate, hydroxide, silicate, chlorohydrate, etc. Suitable multivalent metal drying salts (e.g., divalent salts, trivalent salts, etc.) may include one or more of calcium chloride, calcium acetate, calcium hydroxide, calcium nitrate, calcium sulfate, calcium sulfite, magnesium chloride, magnesium acetate, magnesium nitrate, magnesium sulfate, magnesium sulfite, aluminum chloride, aluminum nitrate, aluminum sulfate, aluminum chlorohydrate, sodium aluminum sulfate, vanadium chloride, etc.

For the purposes of the present invention, the term "monovalent metal salt drying" refers to those metal drying salts wherein the cationic moiety is a monovalent cation having a positive charge of one (e.g., a sodium cation, a potassium cation, a lithium cation, etc.) such as sodium salts, potassium salts, lithium salts, etc. Suitable monovalent metal drying salts may include one or more of: sodium chloride, sodium acetate, sodium carbonate, sodium bicarbonate, sodium hydroxide, sodium silicates, sodium sulfate, sodium sulfite, sodium nitrate, sodium bromide, potassium chloride, potassium acetate, potassium carbonate, potassium bicarbonate, potassium hydroxide, potassium silicates, potassium sulfate, potassium sulfite, potassium nitrate, potassium bromide, lithium chloride, lithium acetate, lithium carbonate, lithium bicarbonate, lithium hydroxide, lithium silicates, lithium sulfate, lithium sulfite, lithium nitrate, lithium bromide, etc.

For the purposes of the present invention, the term "dry time" refers to the time it takes for deposited ink to dry on the surface of a printable substrate. If the deposited ink does not dry quickly enough, this deposited ink may transfer to other printable substrate sheets, which is undesirable. The percentage of ink transferred ("IT %") is recorded as a measure of the dry time. The higher the amount of the percentage of ink transferred, the slower (worse) the dry time. Conversely, the lower the amount of the percentage of ink transferred, faster (better) the dry time. In general, embodiments of the printable substrates of the present invention provide a percent ink transferred ("IT %") value equal to or less than about 65%. In some embodiments of the printable substrates of the present invention, the IT % value may be equal to or less than about 50%, for example, equal to or less than about 40% (e.g., equal to or less than about 30%.

For the purposes of the present invention, the term "solids basis" refers to the weight percentage of each of the respective solid materials (e.g., paper pulp fibers, etc.) present in, etc., in the absence of any liquids (e.g., water). Unless otherwise specified, all percentages given herein for the solid materials are on a solids basis.

For the purposes of the present invention, the term "solids content" refers to the percentage of non-volatile, non-liquid components (by weight) that are present in the composition, etc.

For the purposes of the present invention, the term "calcium carbonate" refers various calcium carbonates which may be used as paper fillers, such as precipitated calcium carbonate (PCC), ground calcium carbonate (GCC), modified PCC and/or GCC, etc.

For the purposes of the present invention, the term "precipitated calcium carbonate (PCC)" refers to a calcium carbonate which may be manufactured by a precipitation reaction and which may used as a paper filler. PCC may comprise almost entirely of the calcite crystal form of $CaCO_3$. The calcite crystal may have several different macroscopic shapes depending on the conditions of production. Precipitated calcium carbonates may be prepared by the carbonation, with carbon dioxide ($CO_2$) gas, of an aqueous slurry of calcium hydroxide ("milk of lime"). The starting material for obtaining PCC may comprise limestone, but may also be calcined (i.e., heated to drive off $CO_2$), thus producing burnt lime, CaO. Water may added to "slake" the lime, with the resulting "milk of lime," a suspension of $Ca(OH)_2$, being then exposed to bubbles of $CO_2$ gas. Cool temperatures during addition of the $CO_2$ tend to produce rhombohedral (blocky) PCC particles. Warmer temperatures during addition of the $CO_2$ tend to produce scalenohedral (rosette-shaped) PCC particles. In either case, the end the reaction occurs at an optimum pH where the milk of lime has been effectively converted to $CaCO_3$, and before the concentration of $CO_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground $CaCO_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "brightness" refers to the diffuse reflectivity of paper, for example, at a mean wavelength of light of 457 nm. As used herein, brightness of the paper substrate may be measured in terms of ISO Brightness which measures brightness using, for example, an ELREPHO Datacolor 450 spectrophotometer, according to test method ISO 2470-1, using a C illuminant with UV included.

For the purpose of the present invention, the term "printer" refers to any device which prints an image on a printable substrate, such as a paper sheet, including laser printers, inkjet printers, electrophotographic recording devices (e.g., copiers), scanners, fax machines, etc.

For the purpose of the present invention, the term "printer pigment" may refer to either ink (as used by, for example, an inkjet printer, etc.) and toner (as used by, for example, a laser printer, electrographic recording device, etc.).

For the purpose of the present invention, the term "ink" refers to printer pigment as used by ink jet printers. The term ink may include dye-based inks and/or pigment-based inks. Dye-based inks comprise a dye which may be an organic molecule which is soluble in the ink medium. Dye-based inks may be classified by their usage, such as acid dyes, basic dyes, or direct dyes, or by their chemical structure, such as azo dyes, which are based on the based on an —N=N— azo structure; diazonium dyes, based on diazonium salts; quinone-imine dyes, which are derivates of quinine, etc. Pigment-based inks comprise a pigment, which is a solid colored particle suspended in the ink medium. The particle may comprise a colored mineral, a precipitated dye, a precipitated dye which is attached to a carrier particle, etc. Inks are often dispensed, deposited, sprayed, etc., on a printable medium in the form of droplets which then dry on the printable medium to form the print image(s).

For the purpose of the present invention, the term "toner" refers to printer pigment (including toner resins) as used by laser printers. Toner is often dispensed, deposited, etc., on the printable medium in the form of particles, with the particles then being fused on the printable medium to form the image.

For the purposes of the present invention, the term "flooded nip size press" refers to a size press having a flooded nip (pond), also referred to as a "puddle size press." Flooded nip size presses may include vertical size presses, horizontal size presses, etc.

For the purposes of the present invention, the term "metering size press" refers to a size press that includes a component for spreading, metering, etc., deposited, applied, etc., a surface size composition on a paper substrate side or surface. Metering size presses may include a rod metering size press, a gated roll metering size press, a doctor blade metering size press, etc.

For the purposes of the present invention, the term "rod metering size press" refers to metering size press that uses a rod to spread, meter, etc., the surface size composition on the paper substrate surface. The rod may be stationary or movable relative to the paper substrate.

For the purposes of the present invention, the term "gated roll metering size press" refers to a metering size press that may use a gated roll, transfer roll, soft applicator roll, etc. The gated roll, transfer roll, soft applicator roll, etc., may be stationery relative to the paper substrate, may rotate relative to the paper substrate, etc.

For the purposes of the present invention, the term "room temperature" refers to the commonly accepted meaning of room temperature, i.e., an ambient temperature of 20° to 25° C.

For the purposes of the present invention, the term "comprising" means various compounds, components, polymers, ingredients, substances, materials, layers, steps, etc., may be conjointly employed in embodiments of the present invention. Accordingly, the term "comprising" encompasses the more restrictive terms "consisting essentially of" and "consisting of."

For the purposes of the present invention, the term "and/or" means that one or more of the various compositions, compounds, polymers, ingredients, components, elements, capabilities, layers, steps, etc., may be employed in embodiments of the present invention.

Description

For covert marking pigment (CMP) compositions, infrared (IR) absorptive inks and infrared (IR) sensors may be used to track and authenticate a number of different types of documents, including, for example, labels, barcodes, other identifiable markings formed by these IR absorptive inks on the surface of such documents, etc. Once marked, such documents may then be illuminated with IR light and examined by an infrared sensor to authenticate or track the document. Even so, prior IR dyes used in such inks may have associated visible color to them, causing the resulting dye-based IR inks and the printed matter to be visibly colored. Additionally, prior dye-based IR inks have traditionally suffered from limited solubility in the ink base and low light fastness and environmental fastness (e.g., air, water, humidity, thermal fastness, etc.). Further, traditional pigmented IR absorptive inks may include carbon black as the IR absorptive material, resulting in a dark and highly visible ink. Such visibility and potential discoloration issues makes these prior dye-based IR inks problematical when used with, for example, white-tinted paper substrates.

To avoid such visible coloring on white-tinted paper substrates, infrared (IR) anti-Stokes shift pigments may be used as the covert marking pigment (CMP) in these CMP compositions. But in order to include such CMPs, the IR anti-Stokes shift pigment may need to be ground very finely to be compatible with the vehicle used in the CMP composition for dispersing the pigment. Such grinding of these pigments may greatly increase the cost of using them per kilogram of such CMP compositions used. Alternatively, these IR anti-Stokes shift pigments may require surface treatment to be compatible with the ink vehicle so that this vehicle may wet and retain the pigment particles, also adding to the cost of the CMP composition. To be printed onto a paper substrate, such CMP compositions comprising these IR anti-Stokes shift pigments may require a variety of other chemical components (e.g., viscosity modifiers, dispersants, solvents, binders, etc.) to enable the CMP compositions to be printed, to dry and to retain such IR anti-Stokes shift pigments once dried, all of which again add to cost of using these CMP compositions.

In addition, when printing such a CMP composition onto a paper substrate, the IR anti-Stokes shift pigment may need to be printed in a particular location or spot on the paper substrate. That also means that the sensor for the IR anti-Stokes shift pigment may need to be instructed where to look for that pigment. That may be particularly true where the CMP composition is printed onto a paper substrate for the purpose of permitting authentication of the document, such as, for example, banknotes, clothing tags, tickets, badges, etc.

In response to these visibility, cost, etc., issues, embodiments according to the present invention provide covertly marked paper substrate articles which include a paper substrate and a covert marking pigment (hereafter referred to as "CMP"). The CMP has a particle size in the range of from about 0.1 to about 5 microns. This range includes all values and subranges therebetween, including 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 microns. The CMP is incorporated into the paper substrate in a IR detectable amount in the range of from about 0.1 to about 1,000 mg/m$^2$ (such as from about 2 to about 10 mg/m$^2$). This range includes all values and subranges therebetween, including 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 50, 100, 150, 200, 250, 300, 350, 400, 450, 500, 550, 600, 650, 700, 750, 800, 850, 900, 950, and 1000 mg/m$^2$. The CMP can be one or more IR anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof.

Embodiments of the present invention also relate to a process for preparing these covertly marked paper substrates. The process includes the step of providing a composition comprising a CMP having a particle size in the range of from about 0.1 to about 5 microns, the CMP being one or more IR anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof. The process also includes the step of incorporating the composition of step (a) by a non-printing technique into a paper substrate in a IR detectable amount in the range of from about 0.1 to about 1,000 mg/m$^2$ (such as from about 2 to about 10 mg/m$^2$). This range includes all values and subranges therebetween, including 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 50, 100, 150, 200, 250, 300, 350, 400, 450, 500, 550, 600, 650, 700, 750, 800, 850, 900, 950, and 1000 mg/m².

Embodiments of the present invention further relate to a process for adjusting the amount of printer pigment deposited on a paper substrate sheet by providing a covertly marked paper substrate sheet comprising: a paper substrate sheet; and a CMP having a particle size in the range of from about 0.1 to about 5 microns, and being incorporated into the paper substrate sheet in an IR detectable amount in the range of from about 0.1 to about 1,000 mg/m² (such as from about 2 to about 10 mg/m²) and in a manner which identifies a type of covertly marked paper substrate sheet, the covert marking pigment being one or more anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof. These ranges include all values and subranges therebetween, including 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 microns and 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 50, 100, 150, 200, 250, 300, 350, 400, 450, 500, 550, 600, 650, 700, 750, 800, 850, 900, 950, and 1000 mg/m², repectively. In this process, the covertly marked paper substrate sheet is scanned with an IR pigment sensor to identify the type of covertly marked paper substrate sheet. The quantity of printer pigment deposited on the covertly marked paper substrate sheet is adjusted in response to the type of covertly marked paper substrate sheet identified by the IR pigment sensor.

Embodiments of the present invention further relate to a process for determining whether or not a paper substrate sheet is an authentic document. In this process, the paper substrate sheet is also scanned with an IR pigment sensor but to detect whether or the paper substrate sheet incorporates a specified CMP, the CMP being one or more IR anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof. If the IR pigment sensor detects that the paper substrate sheet does incorporate the specified CMP, the paper substrate sheet is identified as authentic. Conversely, if the IR pigment sensor detects that the paper substrate sheet does not incorporate the specified CMP, the paper substrate sheet is identified as counterfeit.

Embodiments of the covertly marked paper substrate (including sheets or reams of such covertly marked paper substrates) according to the present invention thus contain a CMP which is invisible to the naked eye under conditions of illumination by white light. As such, copiers, printers, multifunctional copier/printer/scanner/fax machines, etc., may be equipped with IR sensors to identify the type paper substrate sheet which has the covert marking pigment, and thus may adjust (e.g., reduce) the quantity of toner or ink required to produce a suitable image. Embodiments of the covertly marked paper substrate sheet according to the present invention which contain the CMP may also be used to determine whether from the paper substrate sheet it is an authentic or counterfeit document. In addition, by incorporating the CMP into the paper substrate by other than a printing technique, such as by applying the CMP composition at the size press or by spraying it onto the paper substrate sheet, a larger particle size of CMP may can be used. Such larger particle sizes of CMP may reduce the cost of the CMP compositions, including reducing the cost of how much of the surface area of the substrate needs to be treated with the CMP to be detectable by an IR sensor. In some embodiments, the CMPs, if compatible, may be incorporated as a component of the size press composition. In other embodiments, the CMPs may be incorporated by: spraying the CMP onto a paper substrate; by incorporating the CMP into the paper furnish at the wet end of a paper making machine; by curtain coating the CMP composition; by incorporating the CMP into the paper furnish at the head box; by incorporating the CMP at other nip points into the paper furnish; by bonding the CMP to the paper fibers in the paper furnish; etc.

The CMPs used in such of the CMP compositions may be selected to minimize, avoid, etc., spectral interference with the optical properties of the paper substrate sheet, including such sheets which incorporate, for example, optical brightening agents (OBAs), other paper pigments, especially those imparting a white tint, etc. In other words, the paper substrate sheet treated with the CMP compositions may maintain the desired optical properties in the visible spectrum as if CMP composition were absent, i.e., the CMPs and composition comprising same should be selected so as to not cause spectral interference with the fluorescence of OBAs, etc., which may be used in such paper substrate sheets. Other factors for selecting suitable CMPs may include adverse impacts on the electrostatic properties (resistance, capacitance, etc) of the paper which may be needed, for example, for xerographic copying, whether the CMPs might include hazardous materials, such as heavy metals, which are not toxicologically safe to use with paper substrates, whether the CMPs might adversely impact the shade/color/tint of the paper substrate, whether the CMPs are thermally stable, etc.

In embodiments of processes according to the present invention, the CMP may be distributed in a random pattern, pseudo-random pattern, etc. Such patterns of distribution of the CMP may permit minimizing the amount of CMP incorporated per unit of paper substrate surface, i.e., in terms of mg/m². The CMP composition may be applied to both outer surfaces of the paper substrate, but may also be applied to only one outer surface of the paper substrate. The CMP composition may also be incorporated below the outer surfaces of the paper substrate depending upon the penetrating power of the wavelength that the IR sensor uses. The ability to use IR sensors having wavelengths with increased penetration of the CMP-treated sheet may also permit inclusion of lesser amounts of CMP in the paper substrate sheet.

In some embodiments of the present invention for adjusting ink or toner usage, the IR sensor of the printer, copier, multifunctional copier/printer/scanner/fax machines, etc. may be tuned to inspect each such paper substrate sheet, and to initiate and retain a lower ink or toner usage setting for a specified number of such paper substrate sheets. For example, in some embodiments in the form of a ream of paper substrate sheets, only a portion of the paper substrate sheets are treated with the CMP composition. In these embodiments, only some but not all of a specified number paper substrate sheets of the ream have been treated with the CMP composition. For example, the ream may combine paper substrate sheets such that only a portion (i.e., a specified number) of the paper substrate sheets have been treated with the CMP composition. For example, in some embodiments, from one in three to one in five paper substrate sheets of the ream may be treated with the CMP composition. Such an embodiment would also permit using and combining different rolls of paper substrate wherein, for example, only one of the rolls of paper substrate has been treated with the CMP composition. Such a multi-roll embodiment may reduce the amount of CMP composition required, and thus again reduce the additional cost imparted by the CMP-treated paper substrate sheet. In an alternative embodiment, only the edge of the paper substrate roll may be treated with the CMP composition, for example, by a spraying the CMP composition onto the edge of the roll of paper substrate. In yet another alternative embodiment, a plurality of paper substrate sheets in the form of, for example, a ream may have one edge of the paper substrate sheets in that ream treated with the CMP composition. In such an embodiment, the IR sensor of the printer, copier, multifunctional copier/printer/scanner/fax machines, etc, may be instructed to scan the edge of the ream or partial ream of paper substrate sheets in the tray of the printer, copier, multifunctional copier/printer/scanner/fax machines, etc, to determine the type of paper substrate sheet in the tray and to adjust the ink or toner usage accordingly.

EXAMPLES

Example 1

Paper that had not been treated in a size press was prepared. A size press solution was prepared with starch and the following additives calcium carbonate, sodium chloride and optical brightening agents. The starch solids were adjusted to simulate the starch pick on a production paper machine tonnage targeting 120 pounds per ton total starch pickup. The taggant was added to the starch and applied in surface starch using the sheet fed size applicator. Two taggants used were IR absorbing with green visible light emission (G0) and IR absorbing invisible emission (I0). Loading for each taggant was 25, 50 and 100 ppm based upon paper tonnage targeting 120 pounds per ton total starch pickup.

Conditions: The sheet was weighed before applying the starch. After the starch was applied to the sheet, the wet sheet was then dried and the starch pickup was measured. Control sheets were run without CMPs. Different concentrations of CMP in the size press solution were applied to both sides of the sheet. The example sheets were illuminated and the fluorescent response was measured at 950 nm. The sheets showed an increase in IR emission as the PPM of taggant was increased.

TABLE 1

| CMP Loading (ppm) | CMP Loading (mg/m²) | CMP1 | CMP2 |
|---|---|---|---|
| 0 | 0 | 87 | 87 |
| 25 | 2.2 | 111 | 109 |
| 50 | 4.4 | 127 | 121 |
| 100 | 8.9 | 158 | 130 |

Example 2

The same procedure was followed as in Example 1, but starch solution with CMP was applied to only one side of the sheet. The other side of the sheet had only starch solution applied.

TABLE 2

| CMP Loading (ppm) | CMP Loading (mg/m2) | CMP1 Untreated side | CMP1 Treated side | CMP2 Untreated side | CMP2 Treated side |
|---|---|---|---|---|---|
| 0 | 0 | 87 | 87 | 87 | 87 |
| 25 | 2.2 | 98 | 103 | 95 | 114 |
| 50 | 4.4 | 100 | 111 | 103 | 114 |
| 100 | 8.9 | 127 | 139 | not run | 135 |

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A covertly marked paper substrate article comprising:
   a paper substrate; and
   a covert marking pigment having a particle size in the range of from about 0.1 to about 5 microns and being incorporated into the paper substrate in an infrared (IR) detectable amount of from about 0.1 to about 1,000 mg/m², wherein the covert marking pigment is incorporated into the paper substrate at a wet end of the paper making process such that the covert marking pigment is distributed within the paper substrate,
   the covert marking pigment being one or more IR anti-Stokes shift pigments selected from one or more of: yttrium oxide; sodium yttrium fluoride; lanthanum oxide; lanthanum fluoride; lanthanum oxysulfide; Gadolinium (Gd2O2S); Ytterbium (Yb); or mixtures thereof.

2. The article of claim 1, wherein the covert marking pigment is incorporated into the paper substrate in an IR detectable amount of from about 2 to about 10 mg/m².

3. The article of claim 1, wherein the IR anti-Stokes shift pigments are selected from one or more of: yttrium oxide; sodium yttrium fluoride; lanthanum oxide; Gadolinium (Gd2O2S); or Ytterbium (Yb).

4. The article of claim 1, wherein the covert marking pigment is distributed randomly in the paper substrate.

5. The article of claim 1, wherein the paper substrate has two outer surfaces and wherein the covert marking pigment is further applied to one of the two outer surfaces.

6. The article of claim 1, wherein the paper substrate has two outer surfaces and wherein the covert marking pigment is incorporated between the two outer surfaces.

7. The article of claim 1, which is in the form of a ream of paper substrate sheets, at least a portion of the ream comprising covertly marked paper substrate sheets.

8. The article of claim 7, wherein the covertly marked paper substrate sheets in the ream comprise from one in three to from one in five paper substrate sheets in the ream.

9. The article of claim 7, wherein the paper substrate sheets have two opposed side edges, and wherein the cover marking pigment is further incorporated on one of the side edges of each covertly marked paper substrate sheet in the ream.

10. The article of claim 1, wherein the paper substrate includes an optical brightening agent.

11. A process for preparing a covertly marked paper substrate, the process comprising the following steps:

(a) providing a composition having a covert marking pigment having a particle size in the range of from about 0.1 to about 5 microns, the covert marking pigment being one or more IR anti-Stokes shift pigments selected from one or more of: yttrium oxide; sodium yttrium fluoride; lanthanum oxide; lanthanum fluoride; yttrium oxysulfide; lanthanum oxysulfide; Gadolinium (Gd2O2S); Ytterbium (Yb); or mixtures thereof; and (b) incorporating the composition of step (a) by a non-printing technique into a paper substrate in an IR detectable amount of from about 0.1 to about 1,000 mg/m$^2$, wherein the non-printing technique comprises incorporating the composition of step (a) into the paper furnish at a wet end of a paper making machine and wherein the covert marking pigment is distributed within the paper substrate.

12. The process of claim 11, wherein the composition of step (a) comprises a size press composition which further comprises a sizing agent, and wherein the size press composition is incorporated into the paper substrate in step (b) at a size press.

13. The process of claim 11, wherein the covert marking pigment is incorporated into the paper substrate during step (b) in an IR detectable amount of from about 2 to about 10 mg/m$^2$.

14. The process of claim 11, wherein the IR anti-Stokes shift pigments of step (a) are selected from one or more of: yttrium oxide; sodium yttrium fluoride; lanthanum oxide; Gadolinium (Gd2O2S); or Ytterbium (Yb).

15. The process of claim 11, wherein step (b) is carried out by randomly distributing the covert marking pigment in the paper substrate.

16. The process of claim 11, wherein the paper substrate of step (b) has two outer surfaces and wherein the covert marking pigment is further applied to one of the two outer surfaces during step (b).

17. The process of claim 11, wherein the paper substrate of step (b) is formed into a ream of paper substrate sheets, and wherein from one in three to from one in five paper substrate sheets in the ream are covertly marked paper substrate sheets.

18. The process of claim 17, wherein the paper substrate of step (b) has two opposed side edges, and wherein the cover marking pigment is further incorporated on one of the side edges of each covertly marked paper substrate sheet in the ream.

* * * * *